(12) United States Patent
Wobben

(10) Patent No.: US 6,814,493 B2
(45) Date of Patent: Nov. 9, 2004

(54) PLAIN BEARING AND WIND ENERGY UNIT WITH SAID BEARING

(76) Inventor: Aloys Wobben, Argestrasse 19, Aurich, D-26607 (DE)

( * ) Notice: Subject to any disclaimer, the term of this patent is extended or adjusted under 35 U.S.C. 154(b) by 219 days.

(21) Appl. No.: 10/168,911

(22) PCT Filed: Dec. 22, 2000

(86) PCT No.: PCT/EP00/13166

§ 371 (c)(1), (2), (4) Date: Sep. 19, 2002

(87) PCT Pub. No.: WO01/48376

PCT Pub. Date: Jul. 5, 2001

(65) Prior Publication Data

US 2003/0039419 A1 Feb. 27, 2003

(51) Int. Cl.⁷ .............................................. F16C 17/10
(52) U.S. Cl. ........................ 384/420; 384/110; 384/272
(58) Field of Search ................................ 384/110, 271, 384/272, 420, 421, 422, 423, 424, 425, 426, 427

(56) References Cited

U.S. PATENT DOCUMENTS 3,944,298 A * 3/1976 Cannon ........................ 384/422
5,908,001 A * 6/1999 Burke et al. .................. 384/422
5,937,734 A   8/1999 Stiefel et al. .................. 92/129

FOREIGN PATENT DOCUMENTS

| DE | 41 04 137 C2 | 5/1993 |
|----|--------------|--------|
| DE | 44 13 688 A1 | 10/1995 |
| DE | 195 10 182 A1 | 1/1996 |
| DE | 44 32 800 A1 | 3/1996 |
| DE | 196 29 168 C1 | 10/1997 |
| DE | 298 06 010 U1 | 6/1998 |
| DE | 196 45 581 A1 | 8/1999 |
| DE | 198 14 629 A1 | 9/1999 |
| EP | 0 821 161 A1 | 1/1998 |
| GB | 2 177 374 A | 1/1987 |
| RU | 2054578 C1 | 2/1996 |

OTHER PUBLICATIONS

Hau "Windkraftanlagen" (Wind Power Installations), p. 270. (no date).

* cited by examiner

Primary Examiner—Lenard A. Footland
(74) Attorney, Agent, or Firm—Seed IP Law Group PLLC

(57) ABSTRACT

In a plain bearing for the transmission of high axial forces and great flexural moments with slight relative movements the one co-operating bearing component has an annular rib which engages into an annular groove provided on the other co-operating bearing component. The annular rib which can be of an outwardly convergent trapezoidal cross-section is provided with anti-friction linings on its free side faces and possibly peripheral faces. The anti-friction linings, like the co-operating bearing component in question, in particular an outer ring carrying the annular rib, can be subdivided segment-like. The segments can then be released individually from their composite assembly and maintained, in particular provided with new anti-friction linings. A preferred use of this plain bearing is the arrangement thereof between a pylon-supported machine head and the pylon head of a wind power installation.

9 Claims, 5 Drawing Sheets

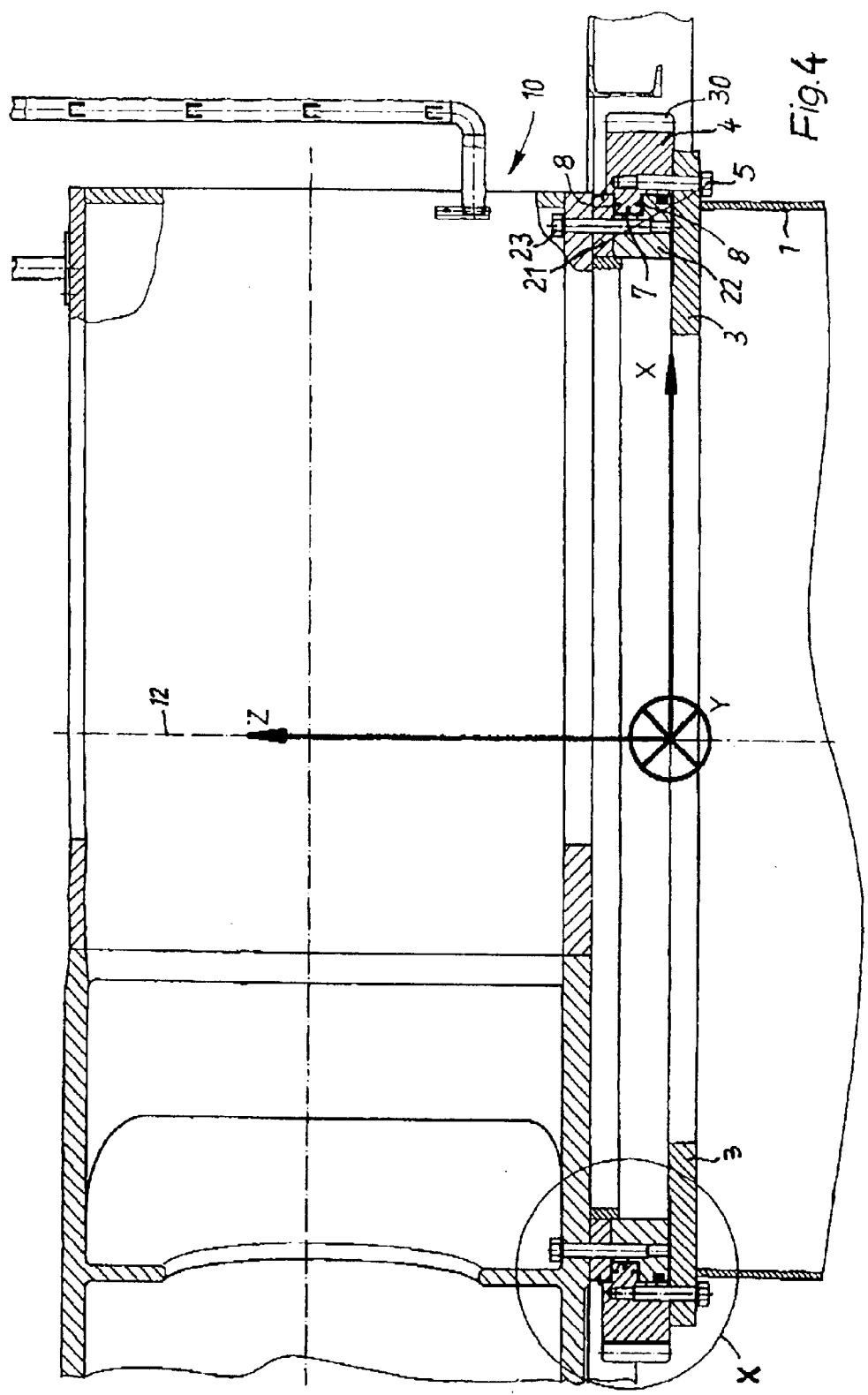

PLAIN BEARING AND WIND ENERGY UNIT WITH SAID BEARING

Figure 1:
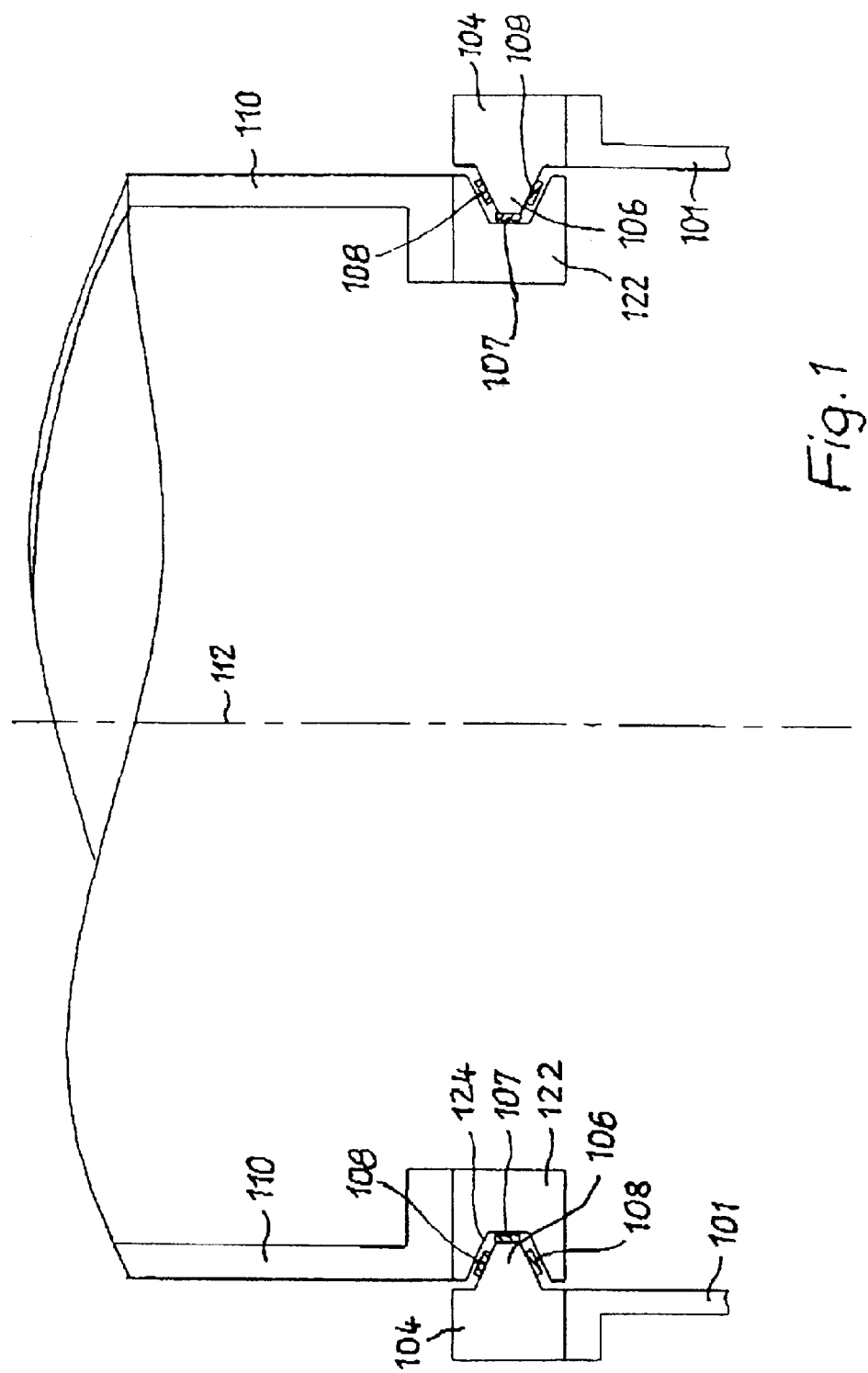

The invention concerns a plain bearing for the transmission of high axial forces and large flexural moments with small relative movements between the co-operating bearing components and a wind power installation with such a plain bearing between its pylon-supported machine head and the pylon head.

Plain bearings involving the demand profile as specified above can be used for example as pivot bearings in cranes, certain leisure and pleasure installations and indeed wind power installations (as so-called azimuth bearings). In that respect, a structural problem arises out of the fact that, even in the case of a vertical rotary axis, the forces, both in the direction of an applied load and also in the lifting-off direction, have to be carried by the bearing.

To attain the object which derives therefrom, in its general aspect the invention provides that an annular rib arranged on one co-operating bearing component engages into an annular groove provided on the other co-operating bearing component. In this case the annular rib may be of both a rectangular cross-section and also an outwardly converging trapezoidal cross-section; it is advantageously provided with anti-friction linings on its free side faces and on its peripheral faces. The anti-friction linings can be omitted in the case of a trapezoidal rib cross-section.

In order to be able to more easily replace the anti-friction linings which are inevitably subjected to wear, a development of the invention provides that the anti-friction linings are subdivided segment-like and are fixedly but releasably connected to the rib.

In particular in such a case it can further be provided that one of the co-operating bearing components is subdivided segment-like and the segments are releasable individually from their composite assembly. In particular the annular rib which is fitted with the anti-friction linings can be subdivided into segments and can be of such a configuration/arrangement that it engages radially from the outside into the inwardly disposed annular groove. Then the annular rib segments with the anti-friction lining segments secured thereto can be gradually released (in the peripheral direction) from their composite assembly and their fixing to the load-bearing or supported component, and pulled radially outwardly, and inserted again after having been fitted with new anti-friction lining segments. It will be appreciated that replacement by a substitute rib member provided with new anti-friction lining segments is also possible.

It will be appreciated that all arrangements can also be respectively reversed. Thus, the anti-friction linings can also be arranged at the inside surfaces of the annular groove which is subdivided segment-like and which engages from the outside over the inwardly disposed annular rib. In addition the respective inwardly disposed component (annular rib or annular groove) can be subdivided into segments. Then however the outwardly diverging wedge shape of the segments is a hindrance in regard to their being pulled out inwardly. In that case therefore the segments are to be edged in parallel relationship and compensating elements are possibly to be provided between the segments carrying the anti-friction linings.

In order to make it easier to replace the segments, it is possible to provide power-operated means such as for example pneumatically or hydraulically piston-cylinder units between the co-operating bearing components, which simultaneously engage them only in the stationary condition and which are capable of lifting the co-operating bearing component which is bearing downwardly, with respect to the bearing component supporting same, so that the fixing of the segments can be released and they can be withdrawn. After they have been refitted, the fixing of the load-relief means, at least to one of the co-operating bearing components, is released again.

In its specific aspect the invention further concerns a wind power installation having a plain bearing of the above-described kind between a pylon-supported machine head and the pylon head, wherein provided between the pylon head and the machine head is a tracking drive for rotation of the machine head about the vertical axis of the pylon, in dependence on wind direction, wherein the plain bearing is adapted to guide the machine head in the radial and in the axial direction.

The rotary bearing which is generally referred to as an azimuth bearing makes it possible—by means of the tracking drive—to adjust the rotor which receives the wind power, in such a way that, depending on the respective wind direction, the highest level of efficiency is achieved and in addition, when the installation is stopped, the loading on all components of the installation is kept as low as possible. Usually, the rotary bearing which must be of large diameter in high-output wind power installations comprises a rotary ball-type connection (DE 41 04 137 C2 and DE 196 29 168 C1). Because generally only slight movements are to be effected about the axis of the pylon in the tracking movement of the machine head but considerable loads have to be carried more specifically when relatively high wind speeds are involved, that results in considerable static or quasi-static pressures in relation to surface area, within the rotary ball-type connection. Added to that is the fact that naturally—and usually advantageously—a rotary ball-type connection opposes only a low level of resistance to the rotary movement, which however in the case of the azimuth bearing has the result that the machine head is involved in a 'nervous, jerky' backward and forward movement when the wind direction experiences rapid changes, for example when the wind is gusty; the attempt is made to remedy that by means of damped control of the tracking movement or also by using mechanical brakes (DE 41 04 137 C2, 196 29 168 C1 and 198 14 629 A1).

In comparison therewith, the plain bearing according to the invention is substantially better suited to carrying high forces when small movements are involved. In the present case however there is also the consideration that the sliding friction in the bearing produces a kind of natural damping of excessively hectic tracking movements. Still further: because the static friction which is opposed to the beginning of a tracking movement is always greater than the sliding friction which occurs after the static friction has been overcome, substantially irrespective of the material pairing involved, the tracking movement is entirely suppressed in the event of short-term and/or minor changes in wind direction.

In the state of the art, plain bearings have already been used as azimuth bearings for wind power installations, but only in relation to relatively small installations (Hau, 'Windkraftanlagen', ['Wind Power Installations'], page 270). Their above-discussed control function is neither recognised therein, nor could it discernibly appear.

The plain bearing can carry vertical forces which occur in the axial direction both in the direction of an applied load and also in the lifting-off direction. The anti-friction linings can be both pinned and also glued to the annular rib. For inspection of the anti-friction linings and therewith the rotary bearing and If necessary for replacement of the anti-friction linings or the segments of the co-operating bearing components, the arrangement preferably has at least one closable maintenance opening in the machine head flange (which opening can be closed for example by a plug); by virtue of rotating the machine head, it is possible to check over and maintain the entire rotary bearing.

The anti-friction linings preferably comprise a metal-plastic composite with a steel back and a pimpled acetal copolymer bearing surface.

Lubrication of the plain bearing is effected from below upwardly by means of continuous lubrication cartridges; old grease is delivered to the exterior on the top side of the bearing, and collected. For that purpose, below the annular groove into which the annular rib engages with the anti-friction linings, a peripherally extending seal is fitted into the machine head flange, which seals off the gap with respect to the pylon head flange. At the top side, a sealing strip is fixed above the annular groove to the machine head flange in such a way that it bears with its free region on the top side of the pylon head flange.

Figure 2:
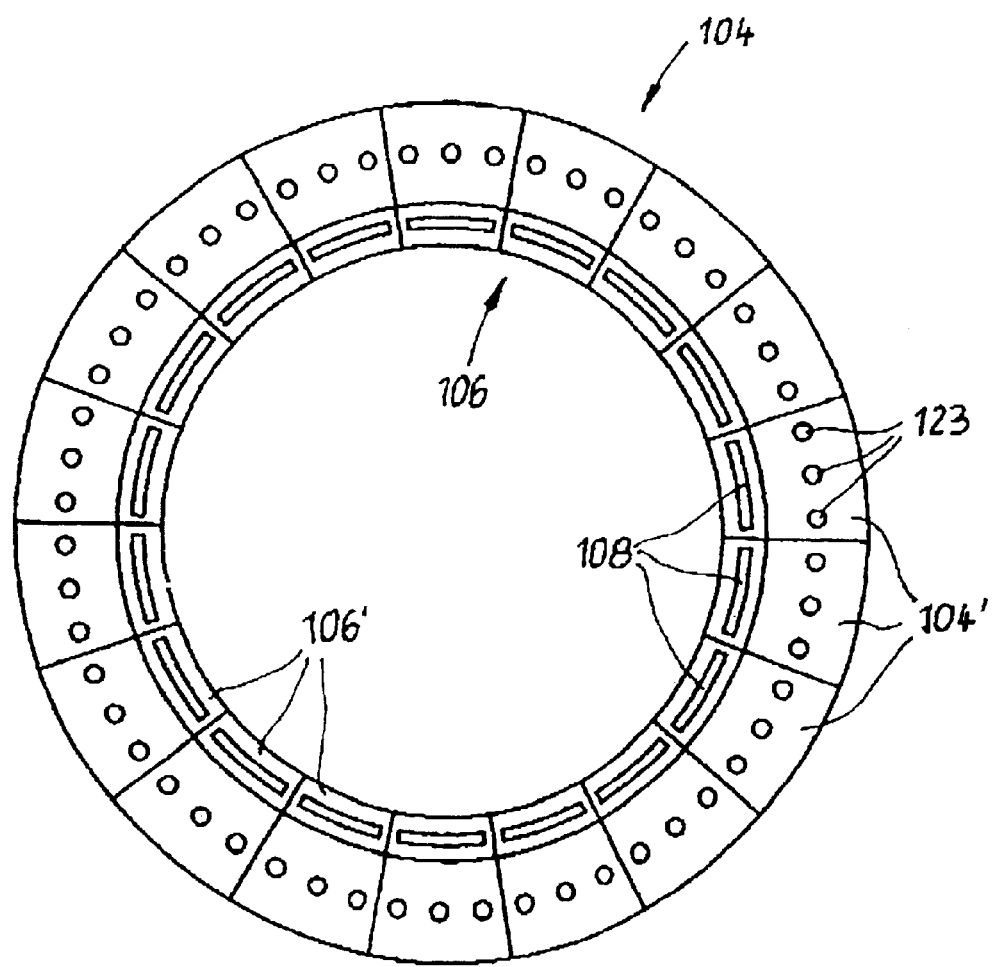
Figure 3:
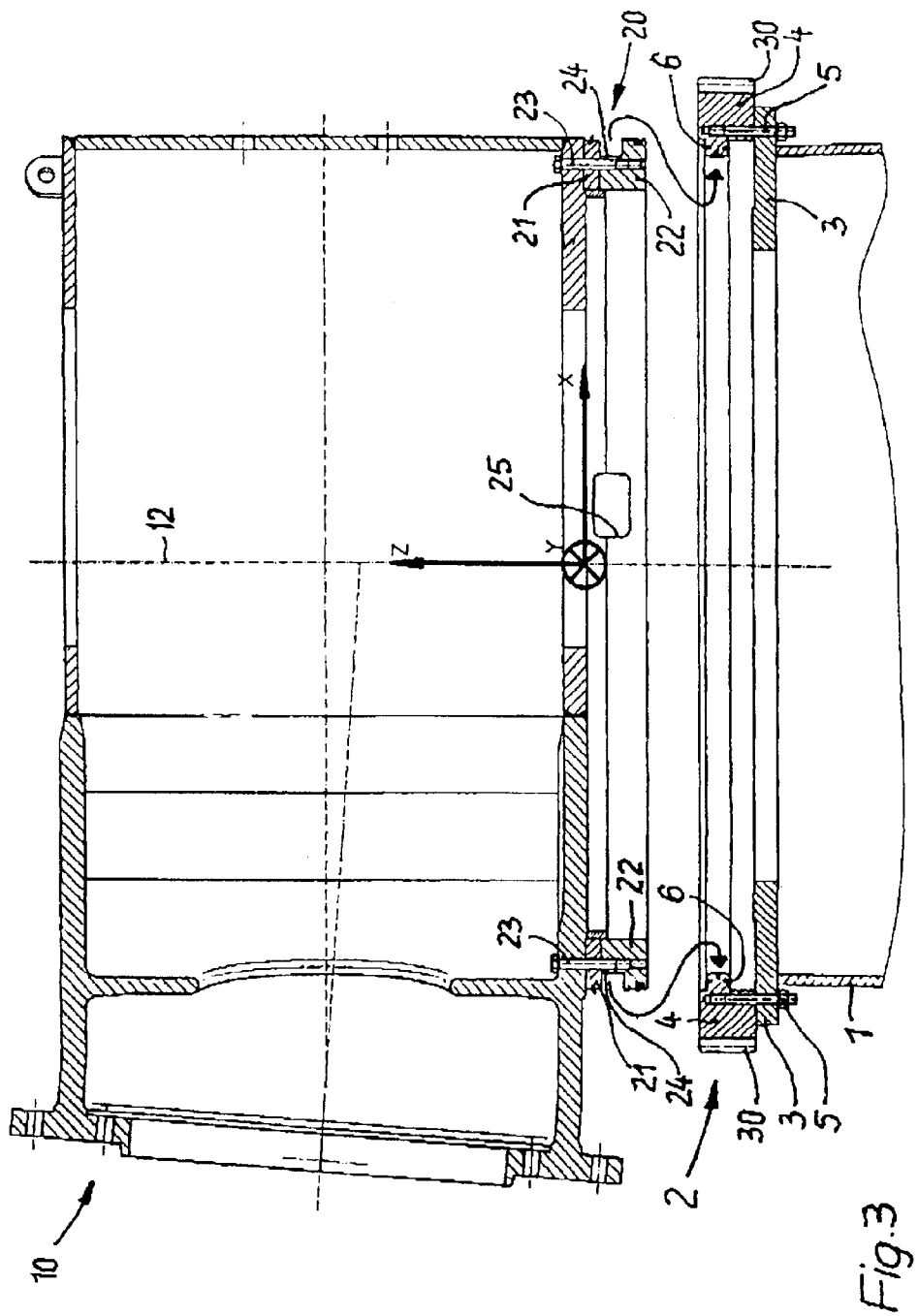
Figure 6:
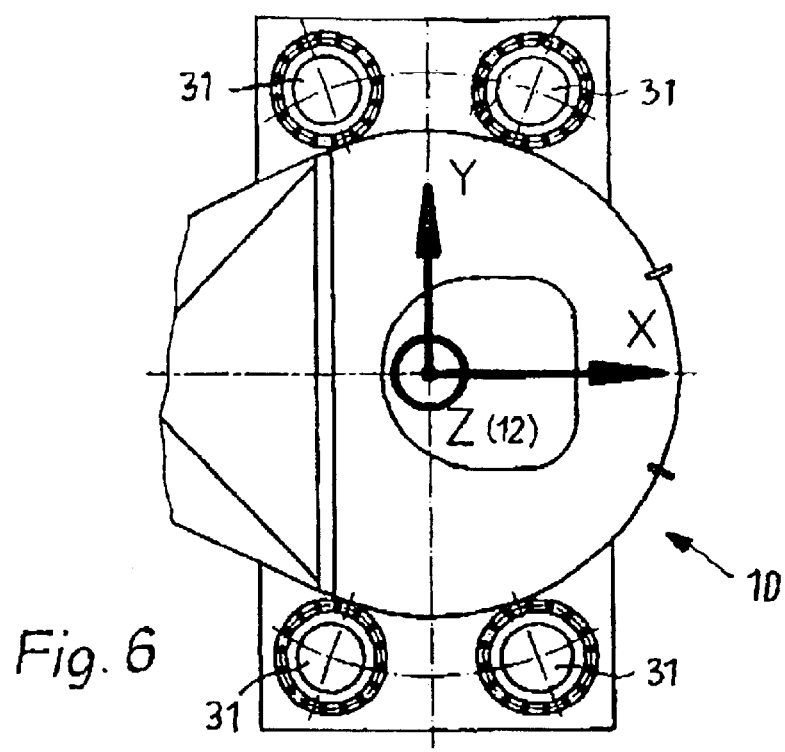
Figure 5:
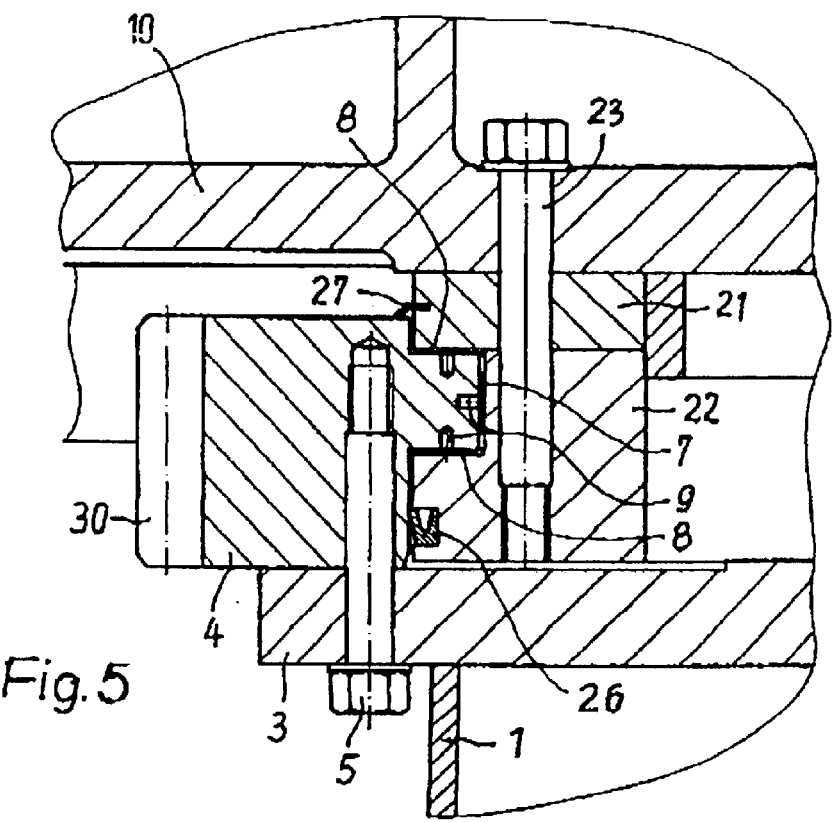

The drawing illustrates the invention in embodiments thereof. In the drawing:

FIG. 1 is a diagrammatic cross-section of a plain bearing according to the invention in a general form, FIG. 2 is a plan view on a reduced scale of the segmented outer ring with the radially inwardly directed annular rib of the plain bearing in FIG. 1, FIG. 3 is a view in cross-section through the machine head housing of a pylon-supported wind power installation with the machine head flange and the upper end of the pylon with the pylon head flange, in the separated condition of the plain bearing, FIG. 4 is a view substantially corresponding to FIG. 3 on a somewhat enlarged scale, in the assembled condition, FIG. 5 shows a partial view on an enlarged scale of the bearing cross-section (circular portion indicated at 'X' in FIG. 4), and FIG. 6 is a diagrammatic plan view of a part of the machine head with the tracking drive.

FIG. 1 diagrammatically shows the configuration and arrangement of a plain bearing according to the invention with an outer race or ring 104 which is fixed to a support structure 101 which is not shown in greater detail. The outer ring 104 is extended radially inwardly in an annular rib 106 which is of a trapezoidal, radially inwardly tapering cross-section. The substantially upwardly and downwardly facing side faces of the annular rib 106 are lined with anti-friction linings in the form of anti-friction lining segments 108 which are fixedly but releasably mounted to the annular rib, for example by pins or by adhesive. The same applies in regard to anti-friction lining segments 107 which are arranged at the inner peripheral surface of the annular rib 106.

The annular rib 106 with its anti-friction lining segments 107, 108 engages into an inner race or ring 122 which is part of a structure 110 rotatable about the axis 112, and which with the outer ring 104 forms the plain bearing.

FIG. 2 shows that and how the outer ring 104 is subdivided into segments 104' which are fixed to the support structure 101 by means of screws 123. The lateral relative orientation of the segments 104' can additionally be ensured by groove-and-tongue connections or the like. It is possible to see, on the rib portions 106' of the annular rib 106, the anti-friction lining segments 108 which, in the event of wear or other maintenance, can be removed together with the outer ring segments 104. That procedure can be made easier by virtue of the fact that power-operating lifting means (not shown) are arranged between the support structure 101 and the inner bearing ring 122 (FIG. 1), which are to lift the structure 110 only in the stationary condition and in that way to permit release of the screw connections 123 and to allow the individual segments 104' to be removed in a radially outward direction.

FIGS. 3–6 show the use of a plain bearing according to the invention between the pylon and the machine head of a wind power installation. Fixed to the upper end of the supporting pylon 1 is a pylon head flange 2 comprising a flange ring 3 and a bearing outer race or ring 4; the parts 3 and 4 are connected together by screws 5. The outside of the bearing outer ring 4 is provided with an outside tooth arrangement 30 into which the pinions of gear motors 31 (FIG. 6) engage and in that way form the tracking drive.

In the usual manner, the machine head housing 10 has a mounting means 11 for the rotor (not shown) and in its interior encloses the mechanical and electrical units (also not shown) of the wind power installation. Fixed to the machine head housing 10 at the underside thereof is a machine head flange 20 which comprises a ring 21 and a bearing inner race or ring 22. The parts 21 and 22 are connected to each other and also to the machine head housing 10 by means of screws 23.

Provided in the bearing inner ring 22 on the outside thereof is an annular groove 24 which is partially bordered by the ring 21. In the assembled condition (FIG. 4), engaging into the annular groove 24 is an annular rib 6 which is provided at the inside on the bearing outer ring 4 of the pylon head flange 2 and which is provided with part-cylindrical anti-friction lining segments 7 for radial guidance and, at the top and at the underneath, with circular ring anti-friction lining segments 8 for vertical guidance. The anti-friction lining segments 7, 8 are glued to the corresponding surfaces of the annular rib 6 and also fixed by pins (FIG. 5). In the direction parallel to the axis 12 of the pylon, the thickness of the annular rib 6 (including the anti-friction lining segments 8) is slightly less than the internal width of the annular groove 24 so that, depending on the respective direction of the vertical force, either the upper or the lower anti-friction lining segments bear against the associated walls of the annular groove 24.

Provided in the machine head flange 20 is a maintenance opening 25 which, even in the assembled condition and in operation of the wind power installation, permits inspection and possibly maintenance or replacement of the anti-friction lining segments 7, 8. In addition, fitted into the bearing inner ring 22 beneath the annular groove 24 is a seal 26 which co-operates with the corresponding surface of the bearing outer ring 4 (see FIG. 5). A lip seal 27 which is let into the ring 21 bears against the top side of the bearing outer ring 4 as part of the pylon head flange 2.

As already indicated above, the tracking drive is formed by four electric motors 31' which engage with their pinions into the tooth arrangement 30 on the bearing outer ring 4 (FIG. 6).

What is claimed is:

1. A plain bearing for the transmission of high axial forces and low flexural moments with slight relative movements between the co-operating bearing components, in which an annular rib (6; 106) arranged on one co-operating bearing component (4; 104) engages into an annular groove (24; 124) provided on the other co-operating bearing component (22; 122) and the annular rib (6; 106) is provided with anti-friction linings (7, 8; 107, 108) on its free side faces characterised in that the anti-friction linings (7, 8; 107, 108) are subdivided segment-like and fixedly but releasably connected to the rib (6; 106).

2. A plain bearing according to claim 1 characterised in that the annular rib (6; 106) is of an outwardly convergent trapezoidal cross-section.

3. A plain bearing according to claim 1 or claim 2 characterised in that the anti-friction lining segments (7, 8; 107, 108) comprise a metal plastic composite with a steel back and pimpled acetal copolymer bearing surface.

4. A plain bearing according to at least one of the preceding claims characterised in that one of the co-operating bearing components (4; 104) is also subdivided segment-like and the segments (104') are individually releasable from their composite assembly.

5. A plain bearing according to claim 4 characterised in that the annular rib (6; 106) which is lined with the anti-friction linings (7, 8; 107, 108) is subdivided into segments (106') and engages radially from the outside into the inwardly disposed annular groove (24; 124).

6. A wind power installation comprising a plain bearing according to at least one of the preceding claims between a pylon-supported machine head (10) and the pylon head (1), wherein provided between the pylon head and the machine head is a tracking drive (30, 31) for rotation of the machine head about the vertical axis of the pylon in dependence on wind direction, and wherein the plain bearing is adapted to guide the machine head (10) in the radial direction and the axial direction relative to the pylon axis (12).

7. A wind power installation according to claim 6 characterised in that in a direction parallel to the axis the total thickness of the annular rib (6) (including the anti-friction lining segments 8) is slightly smaller than the internal width of the annular groove (24).

8. A wind power installation according to claim 6 or claim 7 characterised in that at least one closable maintenance opening (25) is provided in the machine head flange (20) forming the one co-operating bearing component.

9. A wind power installation according to one of claims 1 to 6 characterised in that there are provided stationary power-operated means for relieving the load on (lifting) the co-operating bearing components (4, 22; 104, 122) in the stationary condition when replacing the segments (104', 106').

\* \* \* \* \*

UNITED STATES PATENT AND TRADEMARK OFFICE
CERTIFICATE OF CORRECTION

PATENT NO. : 6,814,493 B2
DATED : November 9, 2004
INVENTOR(S) : Aloys Wobben

It is certified that error appears in the above-identified patent and that said Letters Patent is hereby corrected as shown below:

Column 5,
Line 7, "and pimpled acetal" should read as -- and acetal --.
Lines 8-9, "to at least one of the preceding claims characterized" should read as -- to claim 1 characterised --.
Line 19, "to at least one of the preceding claims between" should read as -- to claim 1 between --.

Column 6,
Lines 10-11, "claim 6 or claim 7 characterised" should read as -- claim 6 characterised --.

Signed and Sealed this

Twenty-seventh Day of September, 2005

JON W. DUDAS
*Director of the United States Patent and Trademark Office*